Patented May 5, 1942

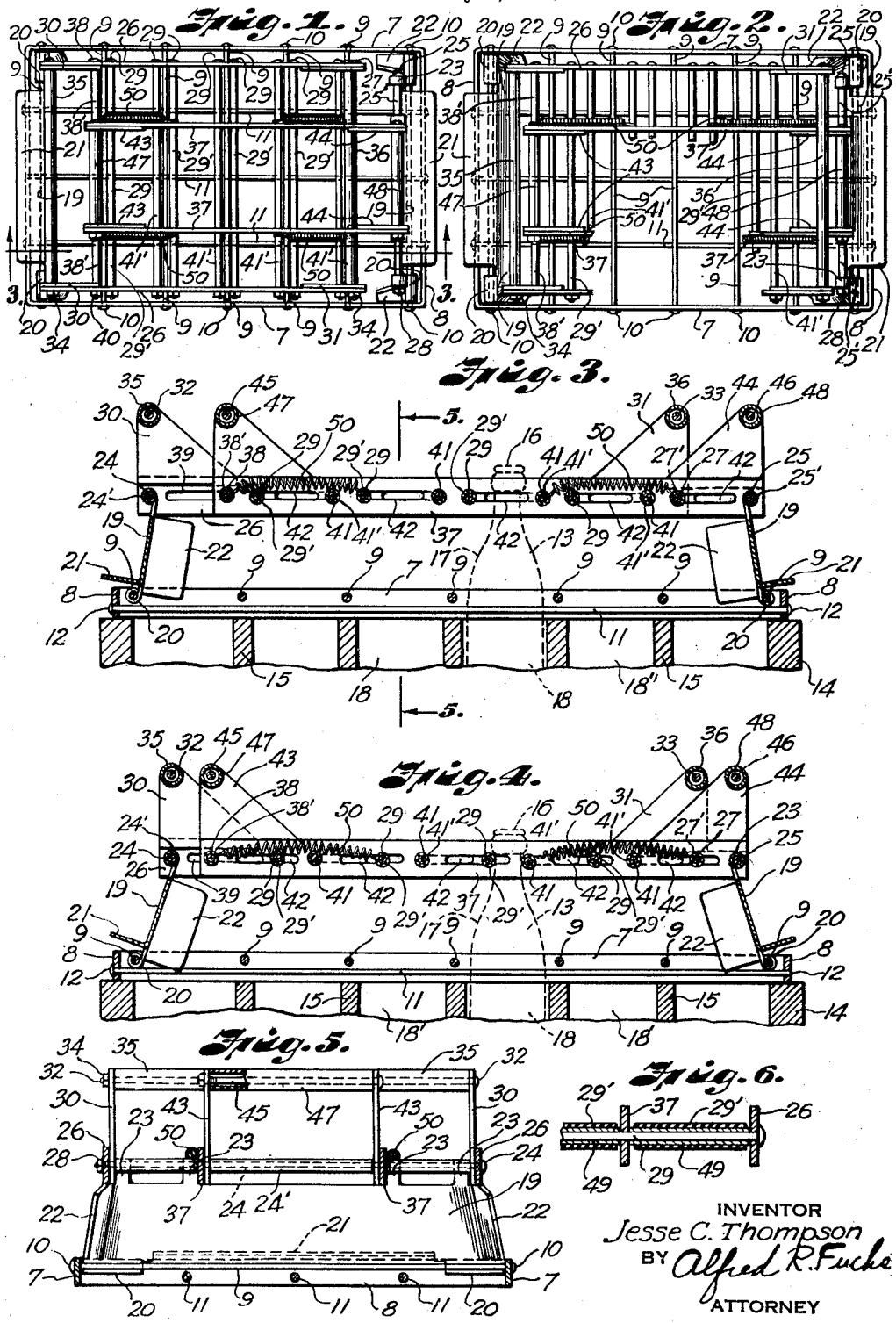

2,281,730

UNITED STATES PATENT OFFICE 2,281,730

BOTTLE HANDLING APPARATUS

Jesse C. Thompson, Kansas City, Kans.

Application May 9, 1940, Serial No. 334,209

20 Claims. (Cl. 294—87)

My invention relates to bottle handling apparatus, and more particularly to means for picking up a group of bottles and carrying the same from one point to another while maintaining the bottles of the group in properly spaced relation to each other.

Bottles such as used for carbonated beverages, or so-called soft drinks, and beer and similar beverages, are usually handled in cases in which the bottles are arranged in rows that run at right angles to each other. Usually there are four rows of bottles running lengthwise of the case and six rows of bottles running crosswise of the case although the number of bottles that may be contained in the case may vary without in any way affecting the purpose of this invention. The important thing is that the bottles are arranged in rows in spaced relation to each other, so that there is a group of bottles that is handled in which the bottles have a definite spaced relationship to each other.

In bottling beverages it is, of course, necessary to wash the bottles and otherwise act on the same, this being usually done by machines into which bottles are fed in large quantities at a rapid rate. The bottles are ordinarily fed into these machines in the bottling plant by conveying means, upon which the bottles must be placed, which conveying means spaces the bottles so that these are fed into the machine in a number of lines, or rows, that are side by side. It has been customary to supply the bottles to the feeding means by hand, the feeding means now commonly in use requiring two men to place the bottles thereon, so that the feeding apparatus can be supplied with bottles at a sufficient rate that the efficiency of the feeding means is not cut down. The customary way of removing bottles from cases and supplying the same to such feeding means by hand, is for the persons that feed the bottles to the feeding apparatus to pick two bottles up in each hand and place the same on the conveying apparatus. Thus two men would place eight bottles on the conveying means, which is usually a series of spaced conveyors, at one operation. My invention comprises a hand tool for picking up a whole case full of bottles at one time, by manual use of said tool by one operative, to feed, or supply, ordinarily, twenty-four bottles to the conveying means at one time in such spaced relation that one bottle of each row, either crosswise or lengthwise of the group of bottles, is supplied to one of the conveyors that are arranged side by side.

In such bottling apparatus, and particularly in plants in which bottles are handled, and also in plants in which bottles are made, the bottles ordinarily leave the apparatus in rows, in spaced relation so that these are in a group, whereby said bottles can be readily engaged by my bottle handling apparatus to pick up, by manual operation, a group of such bottles, enabling a case to be filled with filled bottles, for example, in a single operation, being picked up in a group and deposited in a group in the case.

In order to accomplish this without the requirement of any great amount of skill on the part of the operative, and without the loss of time that might be consumed in getting the handling apparatus in proper relationship to the group of bottles, which would offset any saving of time in handling a large group of bottles by one man, it is necessary to provide an apparatus that is so made that it will substantially automatically guide itself into proper engagement with the bottles if the apparatus is placed in substantially the right position relative to a group of bottles in a case, or on a conveyor, in which the same have some regularity of arrangement in rows crosswise and lengthwise of the group. My invention embodies means whereby the apparatus will be properly positioned relative to a group of bottles in a case, or similar group of bottles, upon being placed in approximately correct relationship thereto, thus making it possible to quickly place the apparatus in cooperative relation to such a group of bottles for picking the same up.

Bottles such as are ordinarily used for carbonated beverages, or other similar drinks, are provided with an enlargement below the portion of the bottle that is immediately adjacent the mouth thereof that is engaged by the crown cap, or similar closure, and a neck portion extends from a slightly reduced portion below this enlargement in a gradually widening curved wall into the main body portion of the bottle, which comprises a lower body portion that is substantially of a cylindrical character. My apparatus accordingly comprises spacing means, which also serves as aligning means, that is engaged by the bottles so that said bottles will assume a substantially definite spaced relationship to each other as the apparatus is placed in position over the group of bottles, so that the smaller upper ends of the bottles will have a definite relationship to gripping means forming part of my apparatus, as said gripping means approaches a position near said smaller or upper ends of the bottles, so that when the bottles are in final position to be gripped, the enlargements adjacent said smaller ends will lie above said gripping means and the reduced neck portion of the bottle below said enlargement will lie between the gripping members that act to hold said bottles and permit the same to be lifted in a group.

The bottle gripping means, preferably, comprises a pair of movable frames, the same being movable relative to each other and also relative to the guiding and spacing means, so that the gripping means can be aligned properly with the necks of the bottles, so that there will be a gripping member mounted on one of said movable members, or frames, and a gripping member mounted on the other of said movable members, or frames, on opposite sides of every bottle that is to be engaged by the gripping means. Also, preferably, guiding means is provided for positioning the gripping members relative to the necks of the bottles, so that said gripping means will be in proper position relative thereto, comprising guide plates that pivotally connect a base frame and one end of each of the movable frames, said guide plates normally inclining toward each other and having end flanges that diverge outwardly from each other, thus co-operating with the bottles to center the bottle carrier relative to the bottles, so that every bottle will be in proper position relative to the gripping means, that the proper spaced relationship of the bottles will be maintained after the same are lifted and held suspended by the bottle handling device.

It is a further purpose of my invention to provide cushioning means on the gripping members and to provide resilient means tending to hold said gripping members separated, and handles for moving the gripping members toward each other against the action of said resilient means, which are located at opposite ends of the apparatus to thus provide means for holding the bottles gripped by the handling means, which also serves as means for carrying the group of bottles in such a manner that the same can be readily placed accurately in position on a conveyor, or similar device, or can be placed in the compartments provided therefor in a bottle case without any difficulty.

Other objects and advantages of my invention will appear as the description of the drawings proceeds. I desire to have it understood, however, that I do not intend to limit myself to the particular details shown or described, except as defined in the claims.

In the drawing:

Fig. 1 is a top plan view of my improved bottle carrier with the gripping members out of gripping position.

Fig. 2 is a similar view thereof, with the gripping members in gripping position, the gripping members being partly broken away to more clearly show the spacing and guiding members below the same.

Fig. 3 is a fragmentary vertical sectional view through a bottle case, showing my improved bottle carrier in vertical section, taken on a line corresponding substantially to the line 3—3 of Fig. 1, and showing a bottle in dotted lines in position on the carrier, but not gripped thereby.

Fig. 4 is a similar view to Fig. 3, showing the parts in bottle gripping position.

Fig. 5 is a section taken on the line 5—5 of Fig. 3, and

Fig. 6 is a fragmentary sectional view taken longitudinally of one of the gripping members.

Referring in detail to the drawing, my improved bottle carrier comprises a base frame having the longitudinally extending side members 7 and the transverse end members 8. While the frame is shown as being of strap metal, it obviously could be made of any desired material and in any desired manner, as long as a rectangular frame is provided. Extending transversely between the longitudinally extending side members 7 are the cross members 9, which are, preferably, made in the form of rods and which are secured in fixed position in the side members 7 in any desired manner, being shown as being headed over, as at 10. The end transverse members 9 also serve as pivot members, as will be explained below.

The members 9 are spaced equidistantly from each other, so as to define spaces of uniform width between the same. Extending between the end members 8 are the longitudinally extending members 11, which are similar to the members 9 and are mounted in a similar manner as the end members 8, and shown as headed over at 12. Said members 11 are thus held in fixed position in the frame and are so spaced relative to each other and to the side members 7, that spaces of equal width are defined by said members 11 and the side members 7, and by the adjacent members 11, said members 11 being, of course, substantially parallel to the side members 7 of the frame, and the members 9 being substantially parallel to the end members 8 of the frame. The frame, or base member, is thus divided into a plurality of equal rectangular areas, each of which is adapted to receive the body portion of a bottle 13 when the base member is placed in position over a bottle case 14, in which the bottles 13 are mounted, having the partitions 15 for holding the bottles in proper spaced relation to each other. The members 9 and 11 act as guiding means to direct the bottles into proper position relative to the rectangular spaces provided in the frame by the longitudinal end transverse members.

It will be obvious that as the bottles in the case, of which only one is shown in Figs. 3 and 4, are engaged by the apparatus, as long as the apparatus is placed somewhere near the right position for engagement with the group of bottles in the case, the upper end portion, or mouth, 16 of the bottle will pass between a pair of rods 9 and a pair of rods 11, or between a pair of rods 9 and a rod 11 and side member 7. As the apparatus is lowered onto the group of bottles, the curved faces 17 on the bottles will cooperate with the rod-like members 9 and 11 to cam the carrier into such position that the bottles will be substantially centered in each of the spaces defined by the rods and the frame. Thus the members 9 and 11 serve not only as spacing members, but also as guiding members for aligning the bottles properly with the carrying apparatus and maintaining the bottles in proper spaced relative arrangement in transverse and longitudinal rows while being transported from one place to another by the carrying apparatus, so that the enlarged or cylindrical bottom portions 18 of the bottles can be guided readily into the compartments 18' of a case, or any similar means, such as a conveyor for receiving the bottles where the same have to be placed in the proper relationship to some receiving means, such as a case or conveyor.

Pivotally mounted on the end cross members 9 are guide plates 19, which have bearing portions 20 mounted on said rods 9 and which have suitable ears or stop flanges 21 thereon that engage the end members 8 of the frame to limit the pivotal movement of said plates 19 in a direction away from each other. The members 19 are normally inclined toward each other, that is, the upper ends thereof are closer together than the lower ends thereof, as will be obvious from Figs. 3 and 4, and are provided with end flanges 22 thereon that diverge from the plate 19, as will be evident from Fig. 5, said end flanges acting as guiding means, in conjunction with the plates 19, to properly position the gripping members, which will be described below, relative to the bottles that are passing between the rods 9 and 11, and the rods 11 and the frame members 7, as the bottle carrying member is being lowered into position over a group of bottles. Each of the plates 19 is also provided with a plurality of pivot ears, or bearing members, 23, which pivotally receive the rod-like members 24 and 25, the rod-like member 24 being associated with one of the frames carrying the gripping members and the rod-like member 25 being associated with the other frame carrying the gripping members.

The pivot member 24 is part of a frame that has the longitudinally extending members 26 and a transversely extending member 27 on the opposite end of the members 26 from the member 24. The members 24 and 27 are, preferably, detachably connected with the members 26 and are shown as having heads at one end thereof and being screw-threaded at the other end thereof, and provided with nuts 28 for detachably securing the members 24 and 27 to the members 26. The threads on the members 24 and 27 are, preferably, damaged after the nuts 28 are put in position, so that the nuts will not accidentally come off during the operation of the device. Rod-like members 29, similar to the members 24 and 27, extend through openings in the side members 26 and are detachably mounted thereon in a similar manner to the members 24 and 27, so that the same can de detached therefrom if this should be desirable.

Each of the members 26 has an upstanding ear, or bracket, 30 provided on one end thereof, secured thereto in fixed position, and a similar upstanding bracket or ear 31 at the other end thereof, secured thereto in fixed position. Said brackets 30 and 31 constitute portions of handles that project upwardly from the frame that includes the members 26, said brackets being connected, respectively, with each other, by means of headed rod-like members 32 and 33, which detachably secure said members together by means of the nuts 34 and suitable threads on the rod-like members, with which said nuts engage. Tubular members 35 and 36 are provided on the rod-like members 32 and 33 that acts as handholds for engagement by the hand of the operator and as spacing sleeves to provide the proper spaced relationship between the side members 26 of the one movable frame. The other movable frame comprises a pair of longitudinally extending bars, or side members, 37, with which the pivot rod 25 is engaged through openings rotatably receiving said rod 25, said rod having a head at one end thereof, as will be clear from the drawing, and having a nut 28 thereon engaging a threaded end of said rod-like member 25 to detachably connect said rod-like member with the member 19 and with the members 37. The position of the members 37 on the rod-like pivot member 25 is maintained by means of a pair of pivot ears 23 and by suitable spacing members, which will be described below.

A rod-like member 38 extends through openings in the opposite ends of the members 37 to those through which the pivot member 25 extends, said rod-like member 38 extending laterally beyond the members 37 through slots 39 in the members 26 and is headed at one end thereof and provided with a nut 40 at the other end thereof to detachably secure said rod-like member in position on the bars 26 and 37. It is, of course to be understood that the threads are damaged, or other suitable means is provided for preventing unscrewing of the nut 40, unless it is desired to detach the rod-like member 38 from the rest of the apparatus. Similar rod-like members 41, similarly detachably mounted on the bar-like members 37 and 26 and extending through similar slots 39 in the members 26, are provided on said members 37. The openings through which the members 24, 27 and 29 extend in the bars 26 are spaced equal distances apart along said bars, as are the openings through which the rod-like members 25, 38 and 41 extend in the members 37. The members 37 are also provided with slots 42, through which the rod-like members 29 and 27 extend.

The side members 37 are provided with upstanding ears, or brackets, 43 and 44 at the opposite ends thereof, similar to the brackets 30 and 31 on the bar-like members 26, and these are connected by means of rod-like members 45 and 46 around which the combined spacing sleeves and handholds 47 and 48 extend. Mounted on the rod-like members that extend transversely of these frames, that is, the members 27, 29, 38 and 41, are spacing sleeves 49, which space the bar-like members 26 and 37 from each other, as will be evident from Fig. 6, thus maintaining the proper position of said bar-like members 26 and 37 relative to each other and preventing laterial shifting of one of the movable frames relative to the other movable frame. Preferably, cushioning elements are provided on each of the rod-like members between each of the bars that these connect, said cushioning elements being, preferably, tubular sleeves such as indicated at 29' in Fig. 6. In order to make the operation of the device clearer, the numeral 29' is applied to the cushioning sleeves mounted on the rod-like members 29, the numeral 38' to the cushioning sleeves on the rod-like member 38 and the numeral 41' to the cushioning sleeves on the rod-like members 41, while the cushioning sleeves surrounding the rod-like member 24 are designated by the numeral 24' and those surrounding the rod-like member 25 by the numeral 25'.

Coil springs 50 are connected each with a rod-like member 27 and a rod-like member 41, and with a rod-like member 38 and a rod-like member 29, which have a normal tendency to draw the parts into the position shown in Figs. 1 and 3, that is, with a rod-like member 29 on one side of each rod 9, and a rod-like member 41 on the other side of each rod 9. Thus a member 29 and a member 41 lies on each side of a bottle that would pass through the space between adjacent rods 9, as shown in Fig. 3, but out of engagement with the bottle, while the springs 50 are operating to hold the parts in this position. Also the rod 24 and the rod 38 will be so spaced relative to the bottles passing between the end rod 9 and the next adjacent rod on one end of the device, while the rod 25 and the rod 27 will be so related to the rod 9 and the next adjacent rod on the other end of the device. The transverse rows of bottles between each pair of rods 9 will be so spaced that there will be a bottle between each pair of rods 11 and between each of the outer rods 11 and each side member 7.

The person operating the device will grip, or grasp, the handholds, or handles, 35 and 47 in one hand, and the handholds, or handles, 36 and 48 in the other hand, and pull these toward each other to the position shown in Figs. 2 and 4, whereupon the bottles will be gripped in the manner shown in Fig. 4 between adjacent rod-like members 29 and 41 and adjacent rod-like members 38 and 24, and 27 and 25, the slots 39 and 42 permitting the relative movement of the rod-like members to bring this about. The bottles can then be lifted from the case, or other container, or off a conveyor, or any other surface on which these might be arranged in a group, and will be held gripped in position as long as the handles are held in close adjacency to each other, as shown in Fig. 4. It is, of course, to be understood that any kind of handle and any kind of bracket means for securing these handles to the movable frames may be provided, and that the gripping bars may be mounted detachably in any desired manner on the bar-like members 26 and 37, or any other suitable slotted frame members. If the movable frame members mounted on the pivots 24 and 25 are not so aligned with the base portion of the device that the bottles will assume the proper position therefor shown in Fig. 3, so that the gripping means can properly engage therewith, the inclined plates 19 engaged by the end rows of bottles will position the movable frame members in such a location that the bottles will properly move into position between the rod-like gripping members, as shown in Fig. 3, and the proper location of the bottles relative to the rod-like members 11 will be obtained by the flaring flanges 22, which will guide the base member into proper relationship to the group of bottles transversely of the group. The tubular sleeve-like members 29', 41', 38', 27', 24' and 25' serve to obtain a very firm hold on the bottles and also prevent any damage to the bottles by the rod-like members, or sleeves, which these surround.

What I claim is:

1. In a bottle carrier, case engaging means, bottle spacing means, guiding means engaging bottles in a case to direct the same relative to said spacing means, and means for gripping all the bottles in a case to lift the same therefrom, said spacing means cooperating with said gripping means to hold said bottles in spaced relation to each other upon being lifted from said case.

2. In a bottle carrier, a frame, guides movably mounted on said frame, bottle spacing means fixed on said frame, gripping means mounted on said frame in spaced relation to said spacing means, means tending to move said gripping means out of gripping position and means for moving said gripping means into engagement with a plurality of bottles, said last means comprising handles at opposite ends of said carrier.

3. In a bottle carrier, means for aligning bottles in a plurality of rows running perpendicularly to each other, means engaging bottles in a case to guide the same into cooperative relation with said aligning means and means for gripping all the bottles in a case to lift the same therefrom simultaneously, said gripping means being mounted relative to said aligning means to maintain the bottles lifted from said case in a plurality of rows running perpendicularly to each other after disengagement from said case.

4. In a bottle carrier, a base frame, a pair of frames mounted for limited movement on said base frame and relative to each other, said movable frames having bottle gripping means thereon, means on said base frame for aligning a group of bottles substantially in rows, and means for guiding said bottles into position between the gripping means on one of said movable frames and the gripping means on the other of said movable frames.

5. In a bottle carrier, a base frame, a pair of frames mounted for limited movement on said base frame and relative to each other, said movable frames having bottle gripping means thereon, means on said base frame for aligning a group of bottles substantially in rows, means for guiding said bottles into position between the gripping means on one of said movable frames and the gripping means on the other of said movable frames, resilient means connecting said movable frames tending to move said gripping means away from each other and manual means for moving said frames against the action of said resilient means to engage said gripping means with said bottles.

6. In a bottle carrier, a base frame, a pair of frames mounted for limited movement on said base frame and relative to each other, said movable frames having bottle gripping means thereon, means on said base frame for aligning a group of bottles substantially in rows and spacing the bottles in each row substantially uniformly, and means for guiding said bottles into position between the gripping means on one of said movable frames and the gripping means on the other of said movable frames.

7. In a bottle carrier, a base frame, a pair of frames mounted for limited movement on said base frame and relative to each other, said movable frames having bottle gripping means thereon, means on said base frame for aligning a group of bottles substantially in rows, means for guiding said bottles into position between the gripping means on one of said movable frames and the gripping means on the other of said movable frames, resilient means connecting said movable frames tending to move said gripping means away from each other and manual means for moving said frames against the action of said resilient means to engage said gripping means with said bottles, comprising a handle at each end of each of said movable frames.

8. A bottle carrier, comprising a frame having side members, end members, longitudinal guiding and spacing members extending between said end members in fixed spaced relation and transverse guiding and spacing members extending between said side members in fixed spaced relation, bottle gripping means, and means for mounting said bottle gripping means in spaced relation to said frame, comprising members connected with said bottle gripping means and said frame, having means thereon for directing bottles passing between said guiding and spacing members into position for engagement by said gripping means.

9. A bottle carrier, comprising a bottom member having side members, end members, longitudinal guiding and spacing members extending between said end members in fixed spaced relation and transverse guiding and spacing members extending between said side members in fixed spaced relation, bottle gripping means, and means for mounting said bottle gripping means in spaced relation to said bottom member, comprising guide plates pivotally connected with said bottom member and with said bottle gripping means.

10. A bottle carrier, comprising a bottom frame having longitudinal and transverse guiding and spacing members dividing the same into a plurality of substantially rectangular bottle compartments, bottle gripping means, and means for mounting said gripping means movably in spaced relation to said bottom frame comprising guide plates pivotally connected with said bottom frame adjacent the opposite ends thereof and having guide flanges at their opposite ends.

11. A bottle carrier, comprising a bottom frame having longitudinal and transverse guiding and spacing members dividing the same into a plurality of substantially rectangular bottle compartments, bottle gripping means, and means for mounting said gripping means movably in spaced relation to said bottom frame comprising guide plates pivotally connected with said bottom frame adjacent the opposite ends thereof and having stop flanges thereon engaging said frame to limit the pivotal movement thereof.

12. A bottle carrier, comprising a bottom frame having longitudinal and transverse guiding and spacing members dividing the same into a plurality of substantially rectangular bottle compartments, bottle gripping means, and means for mounting said gripping means movably in spaced relation to said bottom frame, said gripping means comprising two sets of spaced gripping members, the gripping members of one set alternating with the gripping members of the other set, and means connecting the gripping members of each set together to move as a unit and spacing the same from each other.

13. A bottle carrier, comprising a bottom frame having longitudinal and transverse guiding and spacing members dividing the same into a plurality of substantially rectangular bottle compartments, bottle gripping means, and means for mounting said gripping means movably in spaced relation to said bottom frame, said gripping means comprising two sets of spaced gripping members, the gripping members of one set alternating with the gripping members of the other set, and means connecting the gripping members of each set together to move as a unit and spacing the same from each other, said gripping members having a covering of cushioning material thereon.

14. A bottle carrier, comprising a bottom frame having longitudinal and transverse guiding and spacing members dividing the same into a plurality of substantially rectangular bottle compartments, bottle gripping means, and means for mounting said gripping means movably in spaced relation to said bottom frame, said gripping means comprising two sets of spaced gripping members, the gripping members of one set alternating with the gripping members of the other set, and means connecting the gripping members of each set together to move as a unit and spacing the same from each other, each set of gripping members and connecting means forming a frame-like member and means for moving said sets of gripping members toward each other comprising handles at the ends of said frame-like members, providing pairs of adjacent handles at each end of said carrier movable toward each other to move said gripping members into bottle engaging position.

15. A bottle carrier, comprising a bottom frame having longitudinal and transverse guiding and spacing members dividing the same into a plurality of substantially rectangular bottle compartments, bottle gripping means, and means for mounting said gripping means movably in spaced relation to said bottom frame, said gripping means comprising two sets of spaced gripping members, the gripping members of one set alternating with the gripping members of the other set, and means connecting the gripping members of each set together to move as a unit and spacing the same from each other, said gripping members extending parallel to said transverse guiding and spacing members.

16. In a bottle carrier, means for aligning bottles in a plurality of rows running perpendicularly to each other, bottle engaging guiding means on said carrier, and means for gripping a plurality of bottles to lift the same simultaneously from a case, said guiding means cooperating with said aligning and said gripping means to guide bottles in a case into cooperative relation with said aligning means and into position to be engaged by said gripping means, said gripping means being mounted relative to said aligning means to maintain the bottles lifted from said case in a plurality of rows running perpendicularly to each other after disengagement from said case.

17. In a bottle carrier, a base frame, a pair of frames mounted for limited movement on said base frame and relative to each other, said movable frames having bottle gripping means thereon, means on said base frame for aligning a group of bottles substantially in rows, means for guiding said bottles into position between the gripping means on one of said movable frames and the gripping means on the other of said movable frames, resilient means connecting said movable frames tending to move said gripping means in one direction relative to each other and manual means for moving said frames against the action of said resilient means in the opposite direction relative to each other, comprising a handle fixed to each of said movable frames.

18. A bottle carrier, comprising a bottom frame having longitudinal and transverse guiding and spacing members dividing the same into a plurality of substantially rectangular bottle compartments, bottle gripping means, and means for mounting said gripping means movably in spaced relation to said bottom frame comprising guide members pivotally connected with said bottom frame and with said gripping means and having guide flanges thereon.

19. A bottle carrier, comprising a bottom frame having longitudinal and transverse guiding and spacing members dividing the same into a plurality of substantially rectangular bottle compartments, bottle gripping means, and means for mounting said gripping means movably in spaced relation to said bottom frame comprising guide members pivotally connected with said bottom frame and with said gripping means, and means for limiting the swinging movements of said guide members about the pivots thereof.

20. A bottle carrier, comprising a bottom frame having longitudinal and transverse guiding and spacing members dividing the same into a plurality of substantially rectangular bottle compartments, bottle gripping means, and means for mounting said gripping means movably in spaced relation to said bottom frame, said gripping means comprising two sets of spaced gripping members, the gripping members of one set alternating with the gripping members of the other set, and means connecting the gripping members of each set together to move as a unit and spacing the same from each other, each set of gripping members and connecting means forming a frame-like member and means for moving said sets of gripping members toward each other comprising handles movable toward each other to move said gripping members into bottle engaging position.

JESSE C. THOMPSON.